April 30, 1946.  J. BETOCHE  2,399,160
PLANER GAUGE
Filed March 25, 1944
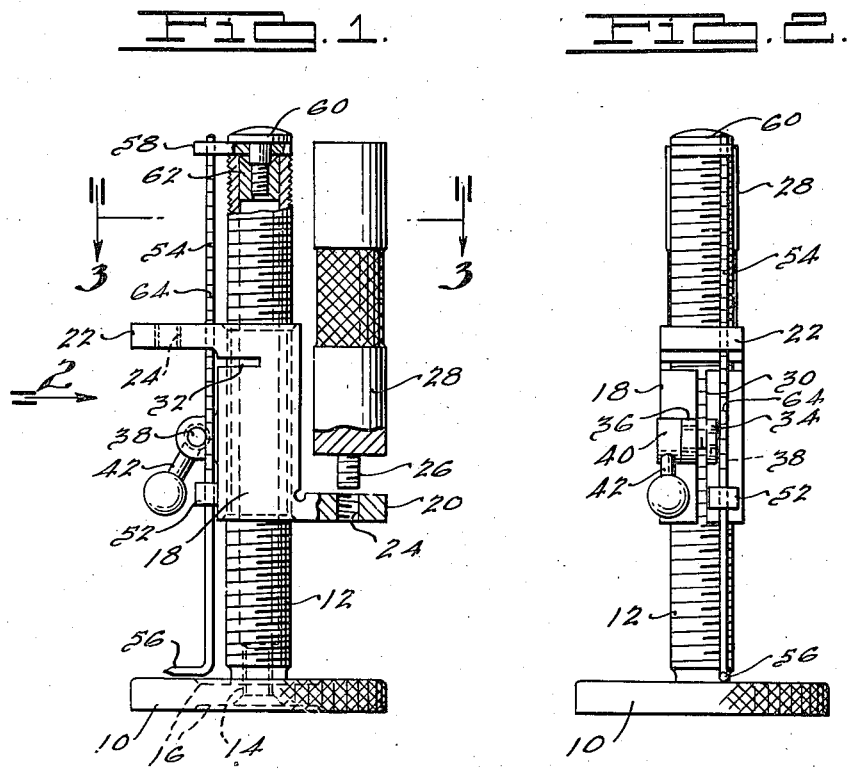
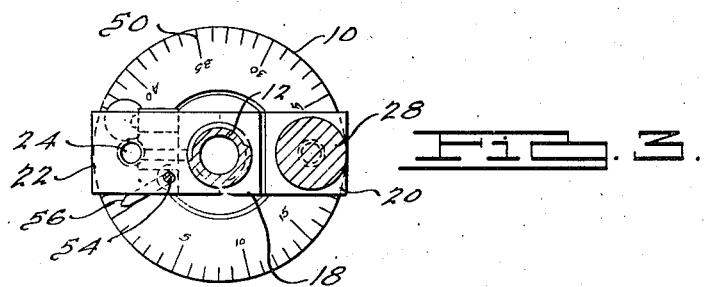
INVENTOR.
Jesse Betoche.
BY
Harness, Dickey & Pierce.
ATTORNEYS.

Patented Apr. 30, 1946

2,399,160

UNITED STATES PATENT OFFICE 2,399,160

PLANER GAUGE

Jesse Betoche, Detroit, Mich.

Application March 25, 1944, Serial No. 528,125

4 Claims. (Cl. 33—164)

This invention relates to those types of gauges generally known as planer gauges and which while primarily adapted to measure or indicate a desired vertical distance between two surfaces are also capable of measuring and/or indicating the measurement of, or between, separated surfaces, bushings, pins or the like regardless of their position.

Objects of the invention include the provision of a gauge of the type described that is simple in construction, efficient in operation, and capable of quick adjustment to exact dimensions; the provision of a gauge device of the type described comprising a base and a threaded post rigidly fixed thereto together with a gauging member threadably mounted on the post and provided with a gauging surface in parallel relation with respect to the base; the provision of a gauge of the type described in which means are provided for releasably locking the gauging member against movement on the post; the provision of a gauge of the type described including a pair of gauging surfaces arranged in parallel relation with respect to the base and in spaced relation to each other longitudinally of the post; and the provision of a gauge of the type described including means cooperating between the gauge member the base permitting relative movement between the gauging surfaces and the base to be visually determined in decimal or fractional parts of an inch.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a side elevational view of my improved gauge;

Fig. 2 is a front elevational view of my improved gauge; and,

Fig. 3 is a transverse sectional view taken on the line 3—3 of Fig. 1.

My improved gauge comprises a flat base 10, preferably of circular conformation as shown, to which is fixed an upwardly extending post 12 concentric therewith. The post 12 may be formed either integrally with the base 10 or else separately therefrom and rigidly secured thereto, the former construction being shown by way of illustration. In the particular case shown, the post 12 is hollow and the lower end of its bore is constricted and threaded as at 14 for a purpose which will hereinafter be explained.

It will be understood that the upper and lower faces of the base 10 are lapped into substantially exact parallelism with each other and into substantially true perpendicular relationship with respect to the axis of the post 12. Preferably the upper and lower faces of the base 10 are centrally relieved as indicated at 16 in Fig. 1 for well understood reasons. Additionally, the peripheral surface of the base 10 is preferably knurled as indicated so as to facilitate manual grasping of the same.

The post 12 is externally threaded and threadably received thereon a gauging member comprising a central sleeve-like portion or nut 18 of relatively extended length axially of the post 12. It will, of course, be understood that the threads on the post 12 and the cooperating threads in the sleeve or nut member 18 are both accurately formed particularly as to lead and relatively closely engage each other.

At its lower end the sleeve or nut 18 is provided with a radially extending gauging projection 20 and at its upper end a similar radially extending gauging projection 22 preferably, but not necessarily, disposed on the diametrically opposite side of the sleeve or nut 18 from the surface 20 as shown. The gauging projections 20 and 22 are of uniform thickness throughout and are preferably formed into substantially exact parallelism with the base 10, regardless of the position of rotation of the sleeve or nut 18 on the post 12. By employing two gauging projections 20 and 22 spaced axially of the nut 18 from one another the checking range of the gauges is increased by approximately the length of the nut 18. Furthermore the projections 20 and 22 preferably project radially outwardly from the axis of the post 12 a distance equal to the radius of the base 10 so as to enable the gauge to be employed as a caliper for checking the width of slots, grooves or the like.

The projections 20 and 22 are each provided with a threaded opening 24 therein preferably approximately centrally thereof for threadable reception of a stud such as 26 formed at the lower end of a cylindrical extension member such as 28. Usually a number of such extension members 28 will be provided each of different predetermined length thereby enabling the effective range of the gauge to be increased thereby. Such extensions are conventional in planer gauges and further description of the same is, therefore, believed unnecessary. A similar extension (not shown) of a larger diameter and preferably of a diameter equal to that of the base 10, having a stud the same as the stud 26, may be threaded into the central opening 14 in the base 10 to obtain a similar effect.

In order to enable the sleeve or nut 18 to be locked in any adjusted position one side thereof is split and provided with means for contracting it at the line of split so as to clamp it to the post 12. In the present case the line of split is indicated at 30 and extends in parallel relation with respect to the axis of the sleeve or nut 18 in central alignment with the gauging extension 22. It extends from the lower end of the sleeve or nut 18 to a point just below the gauging projection 22 where, in order to impart flexibility to the wall portions of the sleeve or nut 18 on either side of the line of split the sleeve or nut 18 is slotted as at 32 in a direction perpendicular to the axis of the sleeve or nut 18 to a point approximately to the axis of the sleeve or nut 18 and equally on either side of the line of split 30.

In order to enable the flexible side wall portions of the sleeve or nut 18 thus provided to be contracted to clamp the sleeve or nut 18 upon the post 12, a lug 34 is fixed with respect to the sleeve or nut 18 on one side of the line of split 30 approximately midway the length thereof and a similar lug 36 is fixed to the sleeve or nut 18 on the opposite side of the line of split 30 and in transverse alignment with the lug 34. Any suitable means may be provided cooperating between the lugs 34 and 36 to permit the same to be drawn toward one another, screw means being shown by way of illustration. While different forms of screw means may be employed, that shown consists of a screw 38 having a head 40, the screw rotatably projecting through the lug 36 and threading into the lug 34 with the head 40 bearing against the outer face of the lug 36. A finger-piece or lever 42 is fixed to and projects radially from the head 40 thereby to permit the screw 38 to be manually operated by pressure applied to the outer end of the finger-piece or lever 42. It may be noted that it is preferable, as shown, that the screw 38 be of such hand, right-hand in the case shown, that when the sleeve or nut 18 is adjusted to the proper height on the post 12 downward pressure on the outer end of the finger-piece or lever 42 will lock the sleeve or nut 18 to the post 12. The base 10 is usually pressed firmly against a surface while such adjustment is being made and in such case, where the pressure applied to the screw 38 is downwardly, there is little tendency to cause the gauge to slip or slide upon the supporting surface. It will be appreciated that if the force applied to lock the screw 38 was in an upward direction it would tend to offset the force holding the gauge against the supporting surface and thereby increase the tendency of the gauge to slip thereon.

It may be noted that the relation of the parts is preferably such that approximately a quarter turn of the screw 38 will be sufficient to either lock the sleeve or nut 18 on the post 12 or to release it from locked position thereon. This is particularly so in the construction shown where it is impossible to turn the screw 38 through a full revolution because of interference between the finger-piece or lever 42 and the body of the sleeve or nut 18. Such interference may, of course, be eliminated by positioning the finger-piece or lever a sufficient distance outwardly from the lug 36 to permit it to clear the side of the sleeve or nut 18.

The gauge thus far described is an entirely satisfactory and operative structure and may be used in the same manner as any planer gauge. For instance, where it is desired to position a tool at a predetermined distance from a planer or other machine tool table, or some parallel work surface, the upper face of either gauging projection 20 or 22 may be adjusted with respect to the lower face of the base 10, by turning the nut 18 on the post 12, and as determined by micrometers, Johansson blocks, or the like, until these surfaces of the gauge are at the desired distance from one another. Then by placing the base on the table, or the work surface, the tool may be adjusted into coplanar relation to the gauging projection surface used, and the machining operation performed with certainty.

If it is desired to determine the exact distance between two parallel surfaces the base 10 may be placed in flat contacting relationship with respect to one of the surfaces, usually the lower, an indicator gauge may be mounted so as to have, for instance, a zero reading when in contact with the remaining surface, and then the sleeve or nut 18 adjusted upon the post 12 until the indicator also reads the same on either the upper surface of the gauging projection 20 or the gauging projection 22. When this condition is obtained the sleeve or nut 18 may be locked to the post 12 through operation of the finger-piece or lever 42, and micrometers or other measuring means employed to accurately determine the distance between the bottom of the base 10 and the upper surface of the gauging surface 20 or 22 thus used. Obviously similar manipulations may be employed for gauging the distances between pins, bushings, holes, or other surfaces or elements in workpieces. Additionally, the gauge may be employed for measuring the width of slots, grooves or the like simply by placing the bottom or outer face of the base 10 against one side thereof and bringing the outer or upper surface of either the gauging extension 20 or 22 into contact with the other surface thereof, upon which a micrometer or other measuring means may be employed to measure the corresponding surfaces of the gauge and thereby accurately determine the width of such slot, groove, or the like. The equal radii of the base 10 and projections 20 and 22 help to permit this type of measurement. Other types and kinds of gauging operations will, of course, be apparent to those skilled in the art as being capable of determination by the gauge thus described.

By a simple addition to the gauge thus far described it may be modified so as to read directly variations in adjustment of the sleeve or nut 18 along the post 12 in decimal or fractional parts of an inch. In such case it is preferable to form the cooperating threads on the post 12 and nut or sleeve 18 so that adjustments may be read directly in decimal or fractional parts of a unit of measurement. For instance, where the readings are to be in decimal parts of an inch then the threads on the post and nut are preferably either twenty to the inch or forty to the inch. In the latter case one complete turn of the nut on the post will correspond to an axial movement of the nut on the post equal to twenty-five thousandths of an inch and in the former case fifty thousandths of an inch. For the purpose of illustration it will be assumed that the threads shown in the drawing are twenty threads to an inch and, accordingly, the upper face of the base 10 is marginally formed to provide a circular scale indicated generally at 50 divided into fifty equal parts each equivalent to one one-thousandth of one inch.

Pointer mechanism is provided for rotation with the sleeve or nut 18 to cooperate with the scale 50 so as to indicate the corresponding movement of the nut 18 on the post 12, and in the construction shown in the drawing this is provided as follows. A lug 52 is fixed with respect to the nut or sleeve 18 below the gauging extension 22 and on that side of the line of split 30 opposite the finger-piece or lever 42. Preferably and as shown the lug 52 is positioned adjacent the bottom of the sleeve or nut 18. A small straight rod or wire 54 arranged in parallel relation with respect to the axis of the post 12 projects downwardly through the gauging extension 12 and lug 52 and is slidably received therein. The rod 54 extends downwardly to a point immediately above the base 10 where its lower end is bent radially outwardly with respect to the axis of the post 12, as at 56, into cooperating relationship with respect to the scale 50 and is pointed to permit its position with respect to the scale 50 to be more accurately determined.

The lower bent end 56 of the rod 54 could, of course, be allowed to rest by gravity upon the upper surface of the base 10 but preferably it is supported upwardly just out of contact therewith. In order to do this an arm 58 is mounted for rotatable movement about the axis of the post 12 at the upper end of the post by means of a shouldered screw 60 which is threaded downwardly into the post and into a nut 62 pressed into the bore thereof. The upper end of the rod 54 is secured by a press fit or otherwise in the arm 58 and is thereby supported and prevented from relative turning by such arm.

From this arrangement it will be appreciated that, by noting the position of the pointed end 56 with respect to the scale 50, and by rotating the nut or sleeve 18 on the post 12 a predetermined number of times or portions thereof, the axial adjustment of the nut or sleeve 18 on the post 12 may be directly determined. If, and as shown, the rod 54 is provided with graduations such as 64 thereon spaced from each other longitudinally of the rod a distance, for instance, equal to the pitch of the threads on the post, or fractions or multiples thereof, these graduations 64 when properly identified and related, for instance, to the upper surface of the projection 22, serve as a linear scale. Where provided to count the turns of the nut on the post in making an adjustment, the amount of adjustment may be thus indicated by the graduations 64 in combination with the scale 50.

While this last described feature may not be essential to the operation of the gauge it may be found desirable in many cases and in any case does not otherwise affect the accuracy or mode of use of the gauge.

Having thus described my invention, what I claim by Letters Patent is:

1. A gauging device comprising, in combination, a flat base, a post projecting upwardly of said base in perpendicular relationship with respect to the lower face of said base, a nut member threaded on said base, a lateral projection on said nut member having a surface in parallelism with said lower surface of said base, a circular scale formed on the upper face of said base, and pointer means secured to said post against movement axially thereof rotatable with said nut member about said post and arranged in cooperative relationship with respect to said scale.

2. In a gauging device comprising, in combination, a base comprising a generally circular member of substantially exact uniform thickness over its radially outer marginal portion, a threaded post fixed centrally with respect to said base in substantially exact perpendicular relation with respect to the lower face of said base, a split nut member threadably received on said post, a radially extending gauging projection projecting from said nut member to substantially the same extent from the axis of said post as the radius of said base, said gauging projection providing a surface in substantially exact parallelism with the bottom face of said base, manually operable means associated with said nut member for contracting said split thereof whereby to releasably clamp said nut member against rotation on said post, a circular scale on the upper face of said base, a rod arranged in axially parallel relation with respect to said post and guided for relative slidable movement in said nut member in the direction of its axis, and a pointer end on said rod arranged in cooperative relationship with respect to said scale.

3. In a gauging device comprising, in combination, a base comprising a generally circular member of substantially exact uniform thickness over its radially outer marginal portion, a threaded post fixed centrally with respect to said base in substantially exact perpendicular relation with respect to the lower face of said base, a split nut member threadably received on said post, a radially extending gauging projection projecting from said nut member to substantially the same extent from the axis of said post as the radius of said base, said gauging projection providing a surface in substantially exact parallelism with the bottom face of said base, manually operable means associated with said nut member for contracting said split thereof whereby to releasably clamp said nut member against rotation on said post, a circular scale formed on the upper face of said base concentrically with said post, a rod arranged in parallel relation with respect to the axis of said post and axially slidably engaging said nut member, an arm rotatably mounted at the upper end of said post for movement about the axis thereof supportingly engaging said rod, and a pointer at the lower end of said rod fixed with respect thereto and arranged in cooperative relationship with respect to said circular scale.

4. In a gauging device comprising, in combination, a base comprising a generally circular member of substantially exact uniform thickness over its radially outer marginal portion, a threaded post fixed centrally with respect to said base in substantially exact perpendicular relation with respect to the lower face of said base, a split nut member threadably received on said post, a radially extending gauging projection projecting from said nut member to substantially the same extent from the axis of said post as the radius of said base, said gauging projection providing a surface in substantially exact parallelism with the bottom face of said base, manually operable means associated with said nut member for contracting said split thereof whereby to releasably clamp said nut member against rotation on said post, a circular scale formed on the upper face of said base concentrically with said post, a rod arranged in parallel relation with respect to the axis of said post and axially slidably engaging said nut member, an arm rotatably mounted at the upper end of said post for movement about the axis thereof supportingly engaging said rod, a pointer at the lower end of said rod fixed with respect thereto and arranged in cooperative relationship with respect to said circular scale, and a linear scale on said rod cooperating with said nut to indicate the position of said nut in units of measurement longitudinally of said post.

JESSE BETOCHE.